United States Patent
Isogai et al.

(10) Patent No.: US 8,471,420 B2
(45) Date of Patent: Jun. 25, 2013

(54) ROTATING ELECTRICAL MACHINE WITH TERMINAL BOX AND SEALING MEMBER

(75) Inventors: Shigetaka Isogai, Nishio (JP); Masafumi Sakuma, Chiryu (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 176 days.

(21) Appl. No.: 12/947,858

(22) Filed: Nov. 17, 2010

(65) Prior Publication Data

US 2011/0115316 A1 May 19, 2011

(30) Foreign Application Priority Data

Nov. 19, 2009 (JP) ................................. 2009-263462

(51) Int. Cl.
*H02K 11/00* (2006.01)
*H02K 5/00* (2006.01)
*H02K 9/00* (2006.01)

(52) U.S. Cl.
USPC .................................. 310/71; 310/54; 310/89

(58) Field of Classification Search
USPC ...................................... 310/71, 54; 903/906
IPC ..................................................... H02K 11/00
See application file for complete search history.

(56) References Cited

U.S. PATENT DOCUMENTS

| 4,712,029 A * | 12/1987 | Nold ............................... 310/71 |
| 5,415,603 A * | 5/1995 | Tuzuki et al. ...................... 477/5 |
| 6,894,410 B2 * | 5/2005 | Kobayashi et al. .............. 310/71 |
| 7,056,104 B2 * | 6/2006 | Kimura et al. ............. 417/410.1 |
| 7,211,913 B2 * | 5/2007 | Tsutsui et al. .................. 310/54 |
| 7,414,338 B2 * | 8/2008 | Endo et al. ....................... 310/52 |

FOREIGN PATENT DOCUMENTS

JP 2004-122979 A 4/2004

* cited by examiner

*Primary Examiner* — Tran Nguyen
*Assistant Examiner* — Thomas Truong
(74) *Attorney, Agent, or Firm* — Buchanan Ingersoll & Rooney PC

(57) ABSTRACT

A rotating electrical machine includes a stator including a coil, a case accommodating the stator and oil, an external connection terminal block arranged at an outer circumferential portion of the case and connecting the coil to an external device, a terminal box arranged at the outer circumferential portion and including a case connecting hole and an external connecting hole respectively in connection with an inner portion of the case and an external atmosphere, the terminal box accommodating the external connection terminal block, a coil wiring member connecting an end portion of the coil to the external connection terminal block by penetrating through the case connecting hole, an external device wiring member connecting the external connection terminal block to the external device by penetrating through the external connecting hole, and a case connecting hole sealing member fixed to the coil wiring member to seal the case connecting hole by fitting thereinto.

3 Claims, 6 Drawing Sheets

Front ⟵⟶ Rear

ROTATING ELECTRICAL MACHINE WITH TERMINAL BOX AND SEALING MEMBER

CROSS REFERENCE TO RELATED APPLICATIONS

This application is based on and claims priority under 35 U.S.C. §119 to Japanese Patent Application 2009-263462, filed on Nov. 19, 2009, the entire content of which is incorporated herein by reference.

TECHNICAL FIELD

This disclosure relates to a rotating electrical machine provided with a terminal block connecting a coil to an external device.

BACKGROUND DISCUSSION

A known drive unit disclosed in JP2004-122979A (hereinafter referred to as Reference 1) is provided with a terminal block connecting a motor coil of a motor to an external device. The drive unit includes the motor (rotating electrical machine), a terminal box, and the like that are accommodated within a housing main body (motor case). The housing main body is divided into a gear box and a motor case. The gear box includes therein an oil chamber. The motor case accommodates therein the motor having a rotor and a stator that includes the motor coil. The terminal block is arranged at an outer circumferential portion of the gear box of the housing main body, that is, the terminal box accommodating therein the terminal block is arranged at the outer circumferential portion of the gear box. An opening portion in connection with the motor case of the housing main body and a fitting hole in connection with an external atmosphere of the housing main body are formed in the terminal box. A distributor wire is connected to an end portion of the motor coil. Further, the distributor wire is inserted in the opening portion by penetrating therethrough so as to be connected to the terminal box. A feeder wire connected to an inverter and the like is inserted in the fitting hole by penetrating therethrough. Further, the feeder wire is connected to the terminal box in a condition where a connecting end portion of the feeder wire is fitted in the fitting hole, thereby being fixed to the terminal box along with the distributor wire. In addition, the terminal box is connected to an oil pool chamber, which is formed at an outer side of the oil chamber in the gear box, via a connecting passage connecting to the oil pool chamber.

For example, in the drive unit according to Reference 1, the motor driving wheels for a hybrid vehicle includes a clutch mechanism accommodated in the gear box of the housing main body and operated by hydraulic pressure. An operating oil for operating the clutch mechanism is stored in the gear box. When the rotor rotates, the operating oil stored in the gear box may leak therefrom and spatter within the housing main body. As described above, the opening portion is formed in the terminal box and the terminal box is connected to the oil pool chamber of the gear box via the connecting passage. Accordingly, the operating oil that is spattered within the housing main body may penetrate into the terminal box through the opening portion and the connecting passage and therefore is attached to the terminal block. As a result, the terminal block may corrode because of moisture and the like included in the operating oil.

As described above, the terminal box connects the distributor wire to the feeder wire that is connected to the inverter and the like. For example, when the motor is checked for maintenance and repair, the feeder wire is often detached/attached from/to the inverter and the like. Accordingly, in a case where the terminal block is corroded by the operating oil spattered within the housing main body, an electrical contact failure may occur in the motor.

A need thus exists for a rotating electrical machine, which is not susceptible to the drawback mentioned above.

SUMMARY

According to an aspect of this disclosure, a rotating electrical machine includes a stator having a coil, a case accommodating the stator and storing oil, an external connection terminal block arranged at an outer circumferential portion of the case and connecting the coil to an external device, a terminal box arranged at the outer circumferential portion of the case and including a case connecting hole in connection with an inner portion of the case and an external connecting hole in contact with an external atmosphere of the case, the terminal box accommodating therein the external connection terminal block, a coil wiring member connecting an end portion of the coil to the external connection terminal block by penetrating through the case connecting hole, an external device wiring member connecting the external connection terminal block to the external device by penetrating through the external connecting hole, and a case connecting hole sealing member fixed to the coil wiring member to seal the case connecting hole by fitting thereinto.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
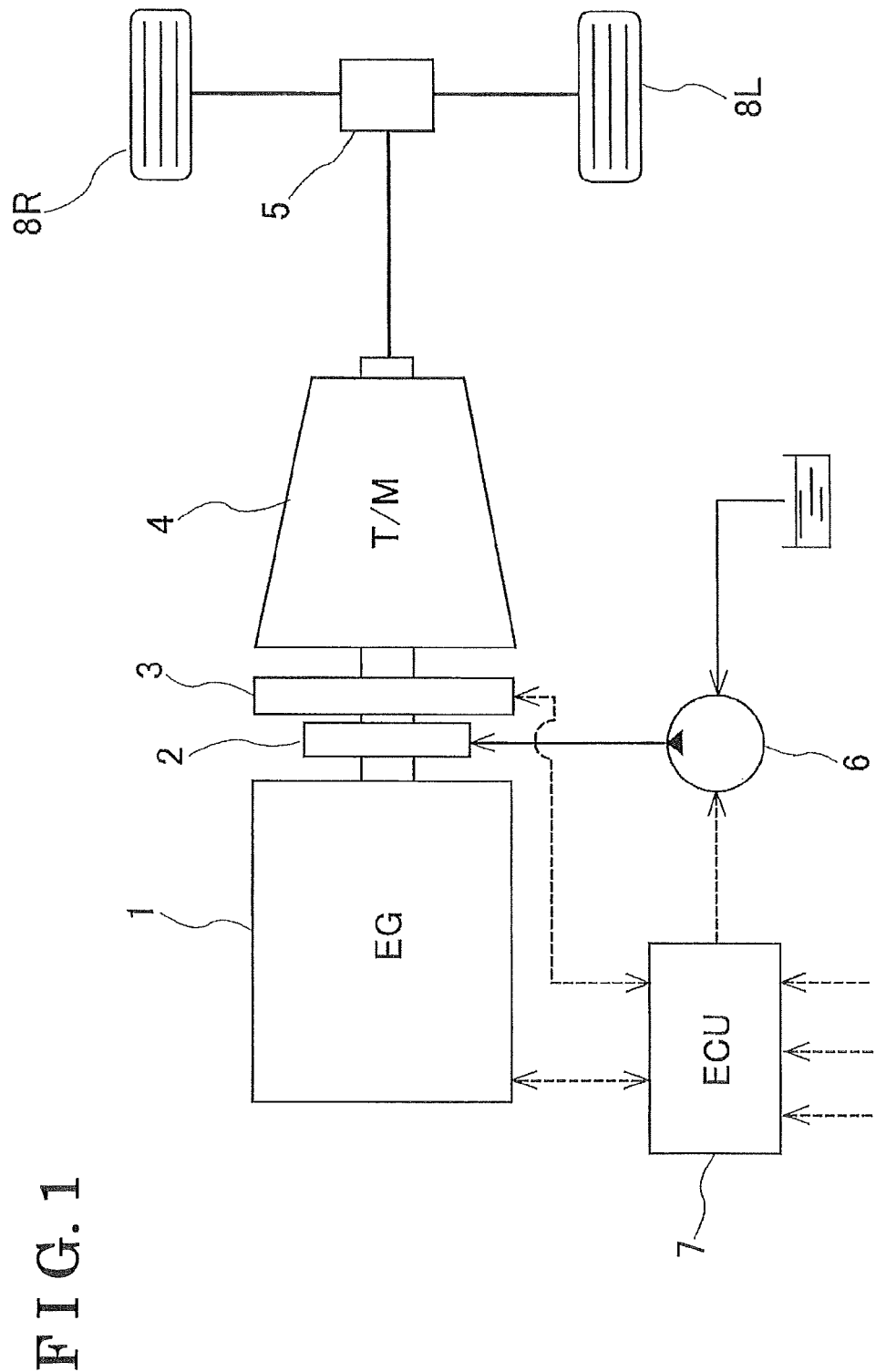
FIG. 1 is a schematic view illustrating a configuration of a drive unit for a hybrid vehicle according to an embodiment disclosed here.

A drive unit for a hybrid vehicle, according to an embodiment of this disclosure will be explained as follows with reference to FIG. 1. FIG. 1 is a schematic view illustrating a configuration of the drive unit of the embodiment. Bold lines shown in FIG. 1 indicate mechanical connections. Arrows indicated by full lines shown in FIG. 1 indicate hydraulic pipelines. Arrows indicated by dashed lines shown in FIG. 1 indicate electrical connections.

As illustrated in FIG. 1, the drive unit includes an engine 1, a clutch mechanism 2, an electric motor 3 serving as a rotating electrical machine, a transmission 4, a differential mechanism 5, an electric pump 6, and a controller 7 serving as an external device.

The engine 1 is a general combustion engine generating a driving force by means of combustion of carbon fuel. The clutch mechanism 2 is operated by hydraulic pressure generated by the electric pump 6 while configuring a wet multiple-disc clutch mechanically connecting the engine 1 or the electric motor 3 to the transmission 4. The electric motor 3 is a synchronous motor. A three-phase electric current passes through the synchronous motor; therefore, the synchronous motor generates a driving force. The transmission 4 is a general automatic transmission. The differential mechanism 5 is a general differential gear. The controller 7 is a control unit controlling the engine 1, the electric motor 3, and the electric pump 6 in accordance with an operation of an accelerator (i.e., an amount by which the accelerator is pressed by a driver).

The engine 1 and the electric motor 3 are connected in series with each other via the clutch mechanism 2. The transmission 4 is connected in series with the electric motor 3. The transmission 4 is further connected to driving wheels 8R and 8L via the differential mechanism 5. The electric pump 6 is connected to the clutch mechanism 2 via a hydraulic pipe. The controller 7 is electrically connected to the engine 1, the electric motor 3, and the electric pump 6. The controller 7 is further connected electrically to an accelerator opening angle sensor, a vehicle speed sensor, and a shift switch of the transmission 4.

Figure 2:
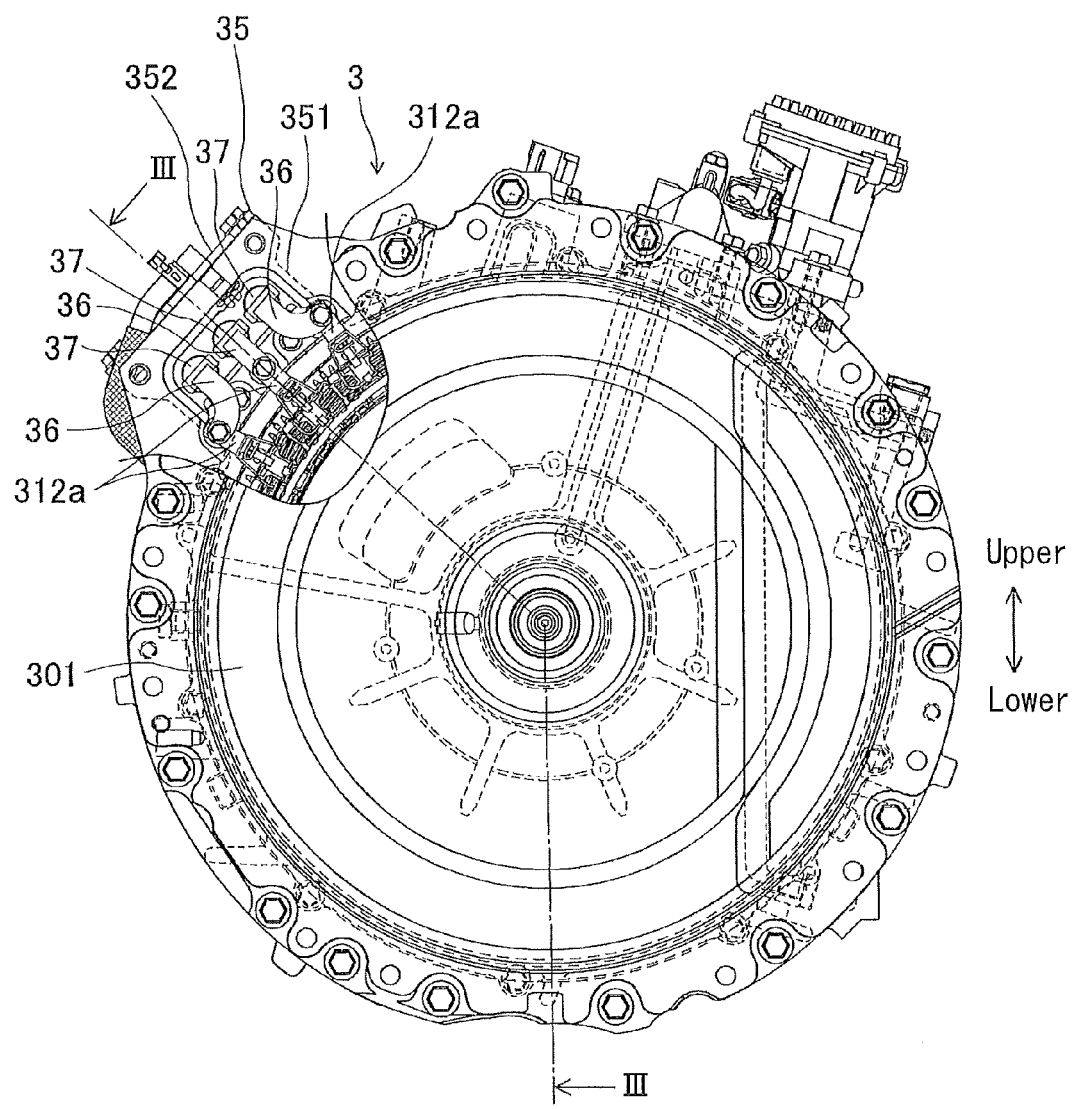
FIG. 2 is a front view of an electric motor shown in FIG. 1.
Figure 3:
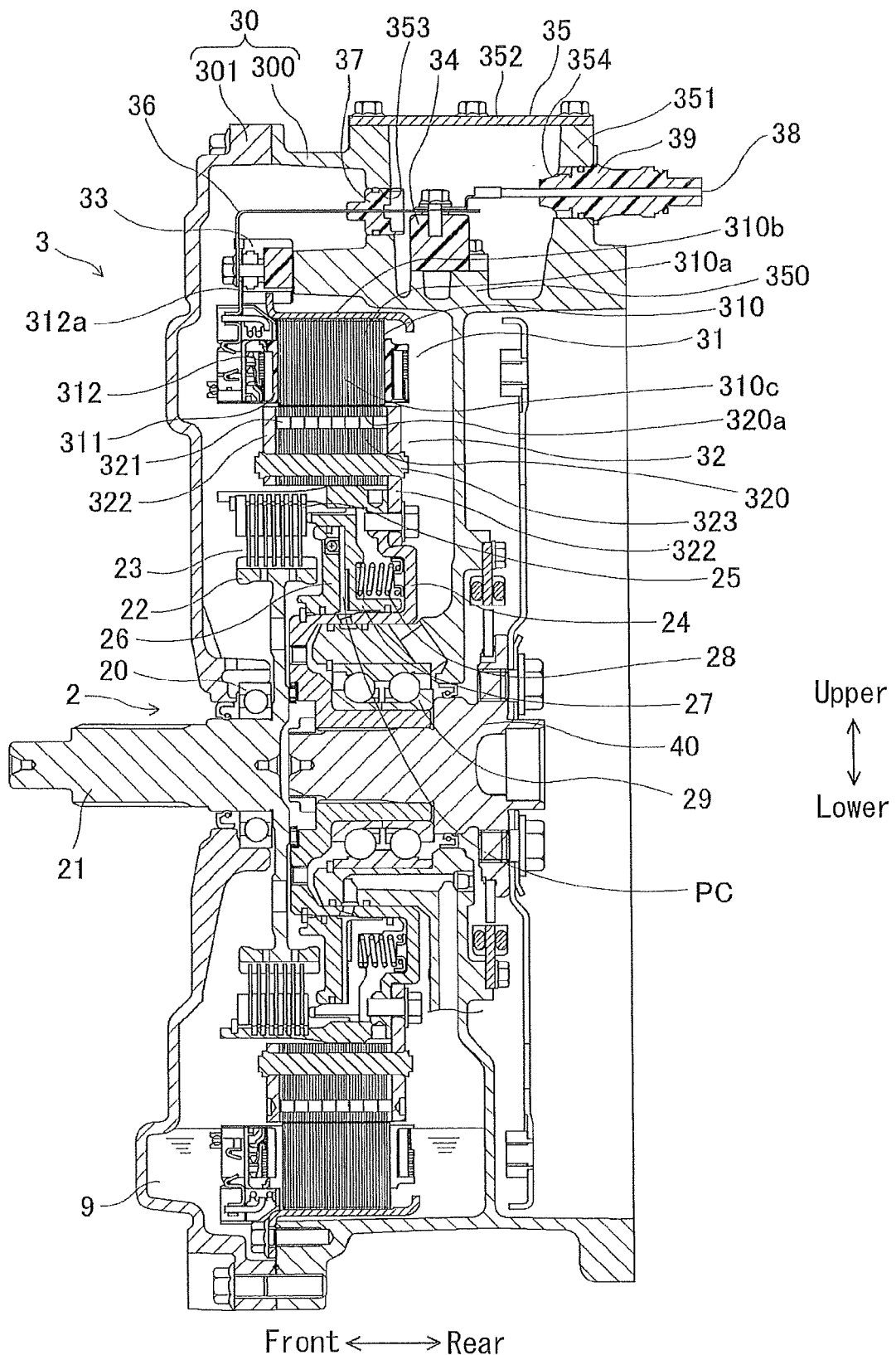
FIG. 3 is a view seen from an arrow III shown in FIG. 2.
Figure 4:
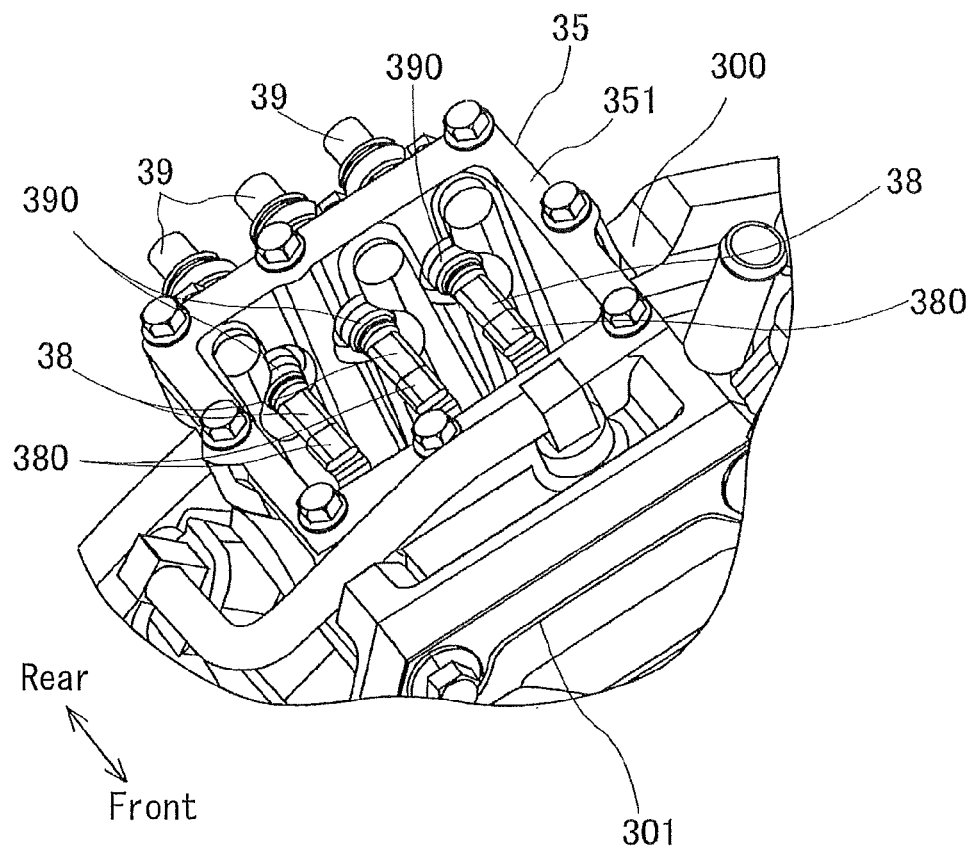
FIG. 4 is a perspective view of an adjacent area of a terminal box in a condition where a cover portion of the terminal box is removed therefrom.
Figure 5:
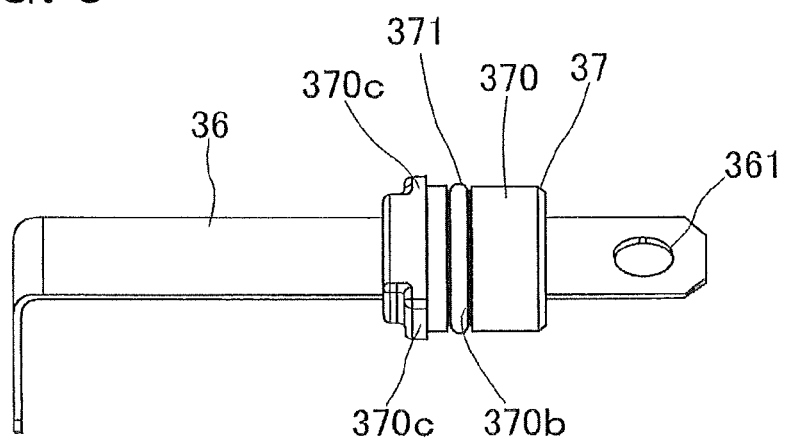
FIG. 5 is a lateral view of a coil wiring member.
Figure 6:
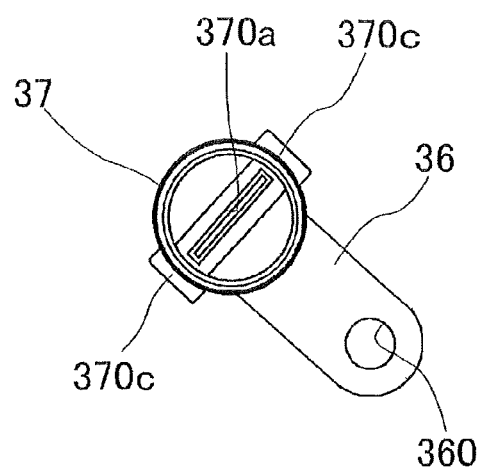
FIG. 6 is a back view of the coil wiring member.
Figure 7:
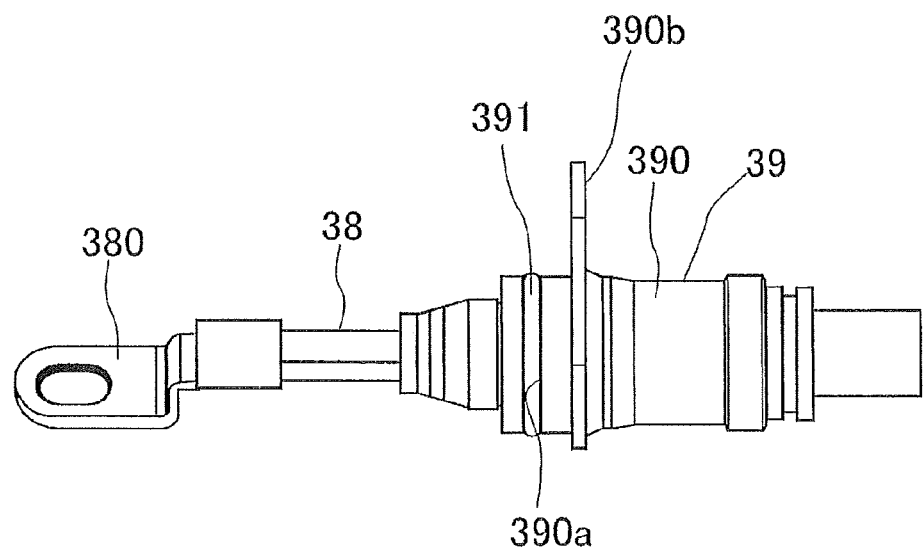
FIG. 7 is a lateral view illustrating a portion of a controller wiring member, one end of which is connected to the electric motor.
Figure 8:
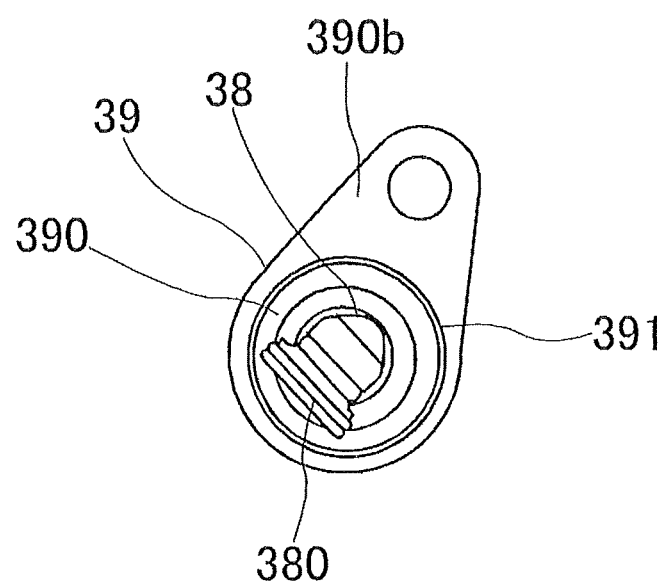
FIG. 8 is a front view of the controller wiring member, the one end of which is connected to the electric motor.

Next, details of the electric motor 3 will be described as follows with reference to FIGS. 2 to 8. A front-rear direction of the electric motor 3 in FIGS. 3, 4, 5, and 7 corresponds to an axial direction of a rotating shaft of the electric motor 3. The front-rear direction is appropriately applied in order to define directions. A front side in the front-rear direction is located in the direction of the engine 1 while a rear side in the front-rear direction is located in the direction of the transmission 4. A vertical direction in FIGS. 2 and 3 corresponds to a vertical direction when the electric motor 3 is mounted on the hybrid vehicle. FIG. 2 is a front view of the electric motor 3 shown in FIG. 3. FIG. 3 is a view seen from an arrow III shown in FIG. 2. FIG. 4 is a perspective view of an adjacent area of a terminal box 35 in a condition where a cover portion 352 of the terminal box 35 is removed therefrom. FIG. 5 is a lateral view of one of coil wiring members 36. FIG. 6 is a back view of the one of the coil wiring members 36. FIG. 7 is a lateral view illustrating a portion of one of controller wiring members 38, one end of which is connected to the electric motor 3. FIG. 8 is a front view of the controller wiring member 38, the one end of which is connected to the electric motor 3.

As illustrated in FIGS. 2 to 4, the electric motor 3 includes a motor case 30 serving as a case, a stator 31, a rotor 32, relay terminal blocks 33, external connection terminal blocks 34, the terminal box 35, the coil wiring members 36, case connecting hole sealing members 37, the controller wiring members 38 serving as external device wiring members, and external connecting hole sealing members 39.

The motor case 30 accommodates therein the stator 31, the rotor 32, and the clutch mechanism 2. The motor case 30 further stores or accommodates therein an operating oil 9 (serving as oil) for operating the clutch mechanism 2. Here, the operating oil 9 is identical to an ATF (Automatic Transmission Fluid) serving as a lubricating oil that lubricates the transmission 4. The motor case 30 includes a motor housing 300 and a motor cover 301.

Each of the motor housing 300 and the motor cover 301 is made of metal and formed in a cylindrical shape having a bottom surface that is positioned at the front side in the front-rear direction in FIG. 3. The motor cover 301 is arranged so as to cover a front opening portion of the motor housing 300 and is fixed thereto by means of a bolt. The stator 31, the rotor 32, and the clutch mechanism 2 are accommodated in a space formed by the motor housing 300 and the motor cover 301. The engine 1 is arranged at a front side of the motor cover 301. Further, the transmission 4 is arranged at a rear side of the motor housing 301 so as to cover a rear opening portion of the motor housing 300 and is fixed thereto by means of bolts. The operating oil 9 (ATF) is stored also in a space formed by the motor housing 300 and the transmission 4.

An electric current passes through the stator 31; thereby, the stator 31 generates a rotating magnetic field. The stator 31 includes a stator core 310, a bobbin 311, and a coil 312.

The stator core 310 configures a portion of a magnetic path. The coil 312 is wound around the stator core 310. The stator core 310 is configured by a plurality of core bodies 310a and a stator ring 310b. Silicon steel plates having approximately T-shapes are layered to thereby form the core bodies 310a. The stator ring 310b is an approximately cylindrical member formed by a magnetic body. The plurality of core bodies 310a arranged in an annular shape is press-fitted or attached within the stator ring 310b by means of an adhesive to thereby configure the stator core 310.

The bobbin 311 is made of resin while insulating the coil 312 from the stator core 310. The bobbin 311 is provided to cover an outer circumferential portion of a teeth portion 310c of the core bodies 310a, which extends in a radial direction of the stator core 310.

When the electric current is applied to each of the coils 312, the coil 312 generates the rotating magnetic field. The coil 312 is formed by a steel bar. The coil 312 is wound on an outer side of the bobbin 311 in the front-rear direction. The coil 312 includes a U-phase coil, a V-phase coil, and a W-phase coil (each of the U-phase coil, the V-phase coil, and the W-phase coil will be hereinafter referred to as the coil 312). The U-phase coil, the V-phase coil, and the W-phase coil are connected to form a Y-connection. Crimp-type terminals 312a are crimped to respective end portions of the U-phase coil, the V-phase coil, and the W-phase coil.

The stator 31 configured as described above is fixed to the motor housing 300 in the motor case 30. In particular, a radially outer portion of the stator ring 310b is fixed to the motor housing 300 by means of bolts.

The rotor 32 is interlinked with the rotating magnetic field generated by the stator 31, thereby generating torque. The rotor 32 includes a rotor core 320, magnets 321, and retaining plates 322 positioned at the front and rear sides, respectively, in the front-rear direction.

The rotor core 320 configures a portion of the magnetic path and has an annular shape in which the magnets 321 are accommodated. Annular silicon steel plates are layered to form the rotor core 320. A plurality of through-holes 320a is formed at a radially outer portion of the rotor core 320 so as to extend in a circumferential direction of the rotor core 320 and to penetrate between front and rear end surfaces of the rotor core 320 in the axial direction of the rotating shaft of the electric motor 3. The axial direction of the rotating shaft corresponds to the front-rear direction as seen in FIG. 3.

The magnets 321 are plate members generating magnetic fluxes. The magnets 321 are accommodated in the respective through-holes 320a of the rotor core 320. The magnets 321 are magnetized in the thickness direction and arranged along the circumferential direction of the rotor core 320 so that magnetic poles circumferentially differing from one another are generated on an outer circumferential surface of the rotor core 320.

The retaining plates 322, each having an annular shape, retain the magnets 321 accommodated in the through-holes 320a, respectively, and fix the rotor core 320 to the clutch mechanism 2. The retaining plates 322 are fixed to the front and rear end surfaces of the rotor core 320 by means of fixing members 323 in the front-rear direction.

The rotor 32 configured as described above is arranged in the motor case 30 in a condition where an outer circumferential portion of the rotor 32 circumferentially faces an inner circumferential portion of the stator 31. In particular, the retaining plate 322 located at the rear side in the front-rear direction is fixed to the clutch mechanism 2 by means of bolts.

Each of the relay terminal blocks 33 connects an end portion of each coil 312 to each of the coil wiring members 36. In particular, the end portions of the U-phase coil, the V-phase coil, and the W-phase coil are connected to the corresponding coil wiring members 36 by the relay terminal blocks 33. The relay terminal blocks 33 are fixed by means of bolts to the motor housing 300 in the motor case 30. In particular, the relay terminal blocks 33 are arranged at an upper side of an oil level of the operating oil 9 stored in the motor case 30 in the vertical direction in FIG. 3.

Each of the external connection terminal blocks 34 connects each coil 312 to the controller 7. In particular, respective end portions of the controller wiring members 38 (external device wiring members) connected to the controller 7 are connected by the relay terminal blocks 33 to the end portions of the U-phase coil, the V-phase coil, and the W-phase coil, respectively. The external connection terminal blocks 34 are arranged at an outer circumferential portion of the motor case 30. In particular, the external connection terminal blocks 34 are provided at the upper side of the oil level of the operating oil 9 stored in the motor case 30 in the vertical direction in FIG. 3. The terminal box 35 is formed in an approximately rectangular hollow solid made of metal. The external connection terminal blocks 34 are accommodated in the terminal box 35. The terminal box 35 includes a bottom portion 350, side wall portions 351, and the cover portion 352. A portion of the bottom portion 350 and a portion of each of the side wall portions 351 are integrally formed with the motor housing 300. Case connecting holes 353, each having a circular shape in cross-section, are formed in one of the side wall portions 351, which is located at the front side in the front-rear direction. The case connecting holes 353 are in connection with an inner portion of the motor case 30. External connecting holes 354 are formed in the other of the side wall portions 351, which is located at the rear side in the front-rear direction. The external connecting holes 354, each having a circular shape in cross-section, are in contact with an external atmosphere of the motor case 30. The external connection terminal blocks 34 are fixed to the bottom portion 350 by means of bolts.

Each of the coil wiring members 36 connects the end portion of each coil 312 to each of the external connection terminal blocks 34. In particular, the end portions of the U-shaped coil, the V-shaped coil, and the W-shaped coil are connected to the external connection terminal blocks 34 by the coil wiring members 36, respectively. As illustrated in FIG. 5, the coil wiring member 36 is a bus bar formed by a plate conductor that is bent into an L-shape. As shown in FIG. 6, a through-hole 360 through which the bolt for fixing the relay terminal block 33 to the motor housing 300 is inserted is formed in a first end portion of the coil wiring member 36, which is located at the front side. Further, as illustrated in FIG. 5, a through-hole 361 through which the bolt for fixing the external connection terminal block 34 to the bottom portion 350 is inserted is formed in a second end portion of the coil wiring member 36, which is located at the rear side.

Each of the case connecting hole sealing members 37 is fixed to each of the coil wiring members 36 so as to fit to each of the case connecting holes 353, thereby sealing each case connecting hole 353. The case connecting hole sealing member 37 includes a body portion 370 and an O-ring 371. The body portion 370 is made of resin while having an approximately column shape. As shown in FIG. 6, a through-hole 370a having a rectangular shape is formed in the body portion 370. The coil wiring member 36 is inserted in the through-hole 370a so as to penetrate therethrough. Further, a groove 370b is formed at an entire outer circumferential portion of the body portion 370. The O-ring 371 is fitted in the groove 370b. Furthermore, flanged portions 370c are formed at an outer circumferential portion of the groove 370b, which is located at the front side in the front-rear direction. The case connecting hole sealing member 37 is fixed to the coil wiring member 36 in a condition where the coil wiring member 36 is inserted in the through-hole 370a of the body portion 370.

As shown in FIGS. 2 to 4, in a manner where the case connecting hole sealing member 37 is fixed to the coil wiring member 36, the first end portion of the coil wiring member 36 is connected to the relay terminal block 33 in such a way as to be fastened thereto together with the crimp-type terminal 312a of the end portion of the coil 312 by means of the bolt that is used for fixing the relay terminal block 33 to the motor housing 300, thereby establishing an electrical connection between the coil wiring member 36 and the crimp-type terminal 312a. The second end portion of the coil wiring member 36 is inserted in the case connecting hole 353 from the front side to the rear side in the front-rear direction. Further the second end portion of the coil wiring member 36 is connected to the external connection terminal block 34. At this time, the case connecting hole sealing member 37 is fitted into the case connecting hole 353, thereby sealing the case connecting hole 353. In addition, the flanged portions 370c are in contact with a peripheral edge portion of the case connecting hole 353, therefore preventing the case connecting hole sealing member 37 from penetrating through the case connecting hole 353.

Each of the controller wiring members 38 (external device wiring members) is connected to the controller 7, thereby connecting each of the external connection terminal blocks 34 to the controller 7. As illustrated in FIGS. 7 and 8, the controller wiring member 38 is an electric wire. A crimp-type terminal 380 is crimped to an end portion of the controller wiring member 38. A through-hole is formed in the crimp-type terminal 380.

Each of the external connecting hole sealing members 39 is fixed to each of the controller wiring members 38 and is fitted into each of the external connecting holes 354 of the terminal box 35, thereby sealing each external connecting hole 354. The external connecting hole sealing member 39 includes a body portion 390 and an O-ring 391. The body portion 390 is made of resin while having an approximately column shape. As shown in FIG. 7, a groove 390a is formed at an entire outer circumferential portion of the body portion 390. The O-ring 391 is fitted in the groove 390a. Furthermore, a flanged portion 390b is formed at an outer circumferential portion of the groove 390a, which is located at the rear side in the front-rear direction. The body portion 390 of the external connecting hole sealing member 39 is integrally formed with the controller wiring member 38.

As shown in FIGS. 2 to 4, in a manner where the external connecting hole sealing member 39 is fixed to the controller wiring member 38, the crimp-type terminal 380 of the controller wiring member 38 is inserted to the external connecting hole 354 from the rear side to the front side in the front-rear direction. Further, the crimp-type terminal 380 is connected to the external connection terminal block 34 in such a way as to be fastened thereto together with the second end portion of the coil wiring member 36 by means of the bolt that is used for fixing the external connection terminal block 34 to the bottom portion 350, thereby establishing an electrical connection between the coil wiring member 36 and the controller wiring member 38. At this time, the external connecting hole sealing member 39 is fitted in the external connecting hole 354, thereby sealing the external connecting hole 354. In addition, the flanged portion 390b is in contact with a peripheral edge portion of the external connecting hole 354, therefore preventing the external connecting hole sealing member 39 from penetrating through the external connecting hole 354.

As illustrated in FIG. 3, the clutch mechanism 2 includes a bearing 20, an input shaft 21, a clutch inner member 22, driving discs 23, a clutch outer member 24, driven plates 25, a disc member 26, a piston member 27, an engagement spring 28, and a bearing mechanism 29.

The input shaft 21 is connected to the engine 1. The input shaft 21 is rotatably supported by the motor cover 301 via the bearing 20. The clutch inner member 22 integrally formed with a rear end portion of the input shaft 21. A plurality of driving discs 23 is aligned in the front-rear direction is supported at an outer circumferential portion of the clutch inner member 22 so as to move in the front-rear direction and to rotate along with the clutch inner member 22.

The clutch outer member 24 is rotatably supported by the motor housing 300 via the bearing mechanism 29. The clutch outer member 24 is spline-fitted to a turbine shaft 40 of the transmission 4. Further, the clutch outer member 24 is fixed by means of bolts to the retaining plate 322 positioned at the rear side in the front-rear direction. The driven plates 25 are supported at an inner circumferential portion of the clutch outer member 24 so as to move along with the clutch outer member 24 in the front-rear direction. The driven plates 25 are provided between the driving discs 23.

The disc member 26 is fixed to the clutch outer member 24. The piston member 27 is arranged in a space defined between the clutch outer member 24 and the disc member 26 so as to move therein in the front-rear direction. The engagement spring 28 is arranged in a space formed between the clutch outer member 24 and the piston member 27. The piston member 27 is pressed by a biasing force of the engagement spring 28 toward the front side in the front-rear direction; thereby, the driving plates 23 are pressed by the driven plates 25 to engage the clutch inner member 22 and the clutch outer member 24 with each other accordingly. Meanwhile, in a case where the hydraulic pressure generated by the electric pump 6 is applied to a pressure chamber PC defined between the disc member 26 and the piston member 27, the piston member 27 is move toward the rear side in the front-rear direction to release the engagement between the clutch inner member 22 and the clutch outer member 24.

Next, operation of the drive unit for the hybrid vehicle will be explained as follows with reference to FIGS. 1 and 3. In FIG. 1, the controller 7 controls the engine 1, the electric motor 3, and the electric pump 6 in accordance with a result detected by the accelerator opening angle sensor and the like. When the hybrid vehicle is driven by the driving force of the engine 1, the controller 7 controls the electric pump 6 so that the hydraulic pressure is not applied to the pressure chamber 7 shown in FIG. 3. At this time, the piston member 27 is pressed by the biasing force of the engagement spring 28 toward the front side in the front-rear direction. Accordingly, the driven plates 25 are pressed by the piston member 27 toward the driving discs 23; thereby, the clutch inner member 22 and the clutch outer member 24 are engaged with each other. Then, the controller 7 controls the engine 1 to output a predetermined driving force. The driving force of the engine 1 is transmitted to the transmission 4 via the input shaft 21, the clutch inner member 22, the clutch outer member 24, and the turbine shaft 40. The driving force transmitted from the engine 1 to the transmission 4 is further transmitted to the driving wheels 8R and 8L via the differential mechanism 5. Thus, the hybrid vehicle is driven by the driving force of the engine 1. At this time, the electric motor 3 is rotated by the driving force of the engine 1 in order to serve as a generator.

In addition, when the hybrid vehicle is driven by the driving force of the electric motor 3, the controller 7 controls the electric pump 6 so that the hydraulic pressure is applied to the pressure chamber PC. After the hydraulic pressure is applied to the pressure chamber PC, the piston member 27 is moved against the biasing force of the engagement spring 28 toward the rear side in the front-rear direction. Accordingly, the driven plates 25 are disengaged from the driving discs 23; thereby, the engagement between the clutch inner member 22 and the clutch outer member 24 is released. Then, the controller 7 controls the electric motor 3 to output a predetermined driving force. The driving force of the electric motor 3 is transmitted to the transmission 4 via the clutch outer member 24 and the turbine shaft 40. The driving force transmitted from the electric motor 3 to the transmission 4 is further transmitted to the driving wheels 8R and 8L via the differential mechanism 5. Thus, the hybrid vehicle is driven by the driving force of the electric motor 3.

In FIG. 1, when the hybrid vehicle is driven by the driving force of the engine 1, the electric motor 3 is driven by the driving force of the engine 1 in order to serve as the generator. Meanwhile, when the hybrid vehicle is driven by the driving force of the electric motor 3, the electric motor 3 generates the driving force to thereby rotate.

In Fig, 3, when the rotor 32 rotates, the operating oil 9 stored in the motor case 30 spatters therewithin. However; the case connecting hole sealing member 37 fixed to the coil wiring member 36 is fitted in the case connecting hole 353, thereby sealing the case connecting hole 353. Accordingly, even when the operating oil 9 stored in the motor case 30 spatters therewithin, the operating oil 9 is prevented from penetrating into the terminal box 35.

In addition, according to the embodiment, the coil wiring member 36 serves as a single component. Alternatively, the coil wiring member 36 may be integrally formed with the end portion of the coil 312. In this case, the relay terminal block 33 may be eliminated. As a result, the number of components of the electric motor 3 is reduced.

Moreover, according to the embodiment, the case connecting hole sealing member 37 is fixed to the coil wiring member 36 by means of the adhesive. Alternatively, the case connecting hole sealing member 37 may be integrally formed with the coil wiring member 36. In this case, a working process where the case connecting hole sealing member 37 is fixed to the coil wiring member 36 by means of the adhesive may be eliminated, therefore improving working efficiency.

As described above, according to the electric motor 3 of the embodiment, the case connecting hole 353 is sealed by the case connecting hole sealing member 37 fixed to the coil wiring member 36. Accordingly, even when the operating oil 9 stored in the motor case 30 spatters therewithin, the operating oil 9 is prevented from flowing or penetrating into the terminal box 35. Consequently, in the electric motor 3 driving the driving wheels 8R and 8L of the hybrid vehicle, the external connection terminal block 34 connecting the controller 7 to the coil 312 is prevented from corroding because of spattering of the operating oil 9 accommodated in the motor case 30.

According to the aforementioned embodiment, the electric motor 3 is provided with the external connecting hole sealing member 39 fixed to the controller wiring member 38 to seal the external connecting hole 354 by fitting thereinto.

Accordingly, moisture and the like are prevented from penetrating from the external atmosphere of the electric motor 3 to the terminal box 35. As a result, the external connection terminal block 34 connecting the coil 312 to the controller 7 is prevented from corroding because of the moisture and the like of the external atmosphere of the electric motor 3.

According to the aforementioned embodiment, the external connection terminal block 34 is arranged at the upper side of the oil level of the operating oil 9 stored in the motor case 30.

Accordingly, spattering of the operating oil 9 relative to the external connection terminal block 34 is limited. As a result, the corrosion of the external connection terminal block 34 due to spattering of the operating oil 9 is surely prevented.

According to the aforementioned embodiment, the coil wiring member 36 is the bus bar formed by the plate conductor.

In addition, in a case where the coil wiring member 36 is the electric wire formed by a stranded wire, clearances in the coil wiring member 36 may be eliminated. Accordingly, the operating oil 9 is surely prevented from penetrating into the terminal box 35. Consequently, the corrosion of the external connection terminal block 34 due to spattering of the operating oil 9 is further surely prevented.

According to the aforementioned embodiment, the electric motor 3 is provided with the clutch mechanism 2 operated by the hydraulic pressure within the motor case 30. Further, the oil stored in the motor case 30 is the operating oil for operating the clutch mechanism 2.

According to the aforementioned embodiment, the driving wheels 8R and 8L of the hybrid vehicle are driven by the electric motor 3.

Thus, in the electric motor 3 driving the hybrid vehicle according to the embodiment, the external connection terminal block 34 connecting the coil 312 to the controller 7 is prevented from corroding due to spattering of the operating oil 9 stored in the motor case 30.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:
1. A rotating electrical machine comprising:
a stator including a coil, the coil possessing an end portion;
a case accommodating the stator and configured to store oil, the case possessing an inner portion and an outer circumferential portion;
an external connection terminal block fixed to the outer circumferential portion of the case;
a terminal box arranged at the outer circumferential portion of the case, the terminal box including spaced apart wall portions, a case connecting hole passing through one of the wall portions and an external connecting hole passing through an other of the wall portions which is spaced from the one wall portion, the case connecting hole communicating with the inner portion of the case and the external connecting hole communicating with an external atmosphere of the case, the external connection terminal block being positioned inside the terminal box;
a coil wiring member possessing one end portion and an opposite other end portion, the one end portion of the coil wiring member being electrically connected to the end portion of the coil, the other end portion of the coil wiring member being connected to the external connection terminal block, and an intermediate portion of the coil wiring member located between the one end portion and the other end portion passing through the case connecting hole;
an external device wiring member passing through the external connecting hole and possessing an end portion connected to the external connection terminal block such that the end portion of the external device wiring member is electrically connected to the other end portion of the coil wiring member;
a case connecting hole sealing member including a body portion positioned in the case connecting hole and sealing the case connecting hole, the intermediate portion of the coil wiring member passing through a hole in the case connecting hole sealing member and being held by the case connecting hole sealing member; and
the case connecting hole sealing member including a flanged portion extending radially outwardly beyond an outer peripheral surface of the body portion to prevent the case connecting hole sealing member from penetrating through the case connecting hole, the one wall portion including one side facing the inside of the terminal box and an other side facing away from the inside of the terminal box, the body portion of the case connecting hole sealing member possessing one end positioned in the inside of the terminal box, the body portion of the case connecting hole sealing member including a part extending from the flanged part to the one end, the flanged portion having an outer dimension greater than an entirety of the part of the body portion extending from the flanged part to the one end.

2. The rotating electrical machine according to claim 1, wherein the case connecting hole sealing member includes a pair of circumferentially spaced apart flanged portions extending radially outwardly beyond the outer peripheral surface of the body portion.

3. The rotating electrical machine according to claim 1, wherein the part of the body portion extending from the flanged part to the one end includes a groove extending around an entire outer circumference of the body portion, and an O-ring positioned in the groove.

* * * * *